United States Patent [19]

Zittel et al.

[11] Patent Number: 5,550,927
[45] Date of Patent: Aug. 27, 1996

[54] VEGETABLE PEEL FRACTION INSPECTION APPARATUS

[75] Inventors: David R. Zittel, Columbus, Wis.; Douglas P. Wornson, Northfield, Minn.

[73] Assignee: Lyco Manufacturing, Inc., Columbus, Wis.

[21] Appl. No.: 304,873

[22] Filed: Sep. 13, 1994

[51] Int. Cl.$^6$ .................................................. G06K 9/00
[52] U.S. Cl. ........................... 382/110; 209/939; 348/89; 356/73
[58] Field of Search ....................... 382/110, 108, 382/111, 165, 190, 201, 203; 209/577, 587, 939, 580, 509, 511, 512, 517, 552; 348/86, 89, 92, 125, 128, 131, 127, 132; 356/73, 240, 239, 237, 382, 376

[56] References Cited

U.S. PATENT DOCUMENTS

| | | | |
|---|---|---|---|
| 4,074,809 | 2/1978 | McMillin et al. | 209/75 |
| 4,520,702 | 6/1985 | Davis et al. | 83/71 |
| 4,570,074 | 2/1986 | Jette | 250/563 |
| 4,581,632 | 4/1986 | Davis et al. | 358/106 |
| 4,687,326 | 8/1987 | Corby, Jr. | 356/5 |
| 4,706,120 | 11/1987 | Slaughter et al. | 358/103 |
| 4,735,323 | 4/1988 | Okada et al. | 309/582 |
| 4,741,042 | 4/1988 | Throop et al. | 382/110 |
| 4,831,922 | 5/1989 | Cogan et al. | 99/486 |
| 4,853,533 | 8/1989 | Little et al. | 250/223 |
| 4,866,785 | 9/1989 | Shibano | 382/49 |
| 4,972,091 | 11/1990 | Cielo et al. | 250/562 |
| 4,982,499 | 1/1991 | Fortin | 30/123.5 |
| 5,000,567 | 3/1991 | Nylund | 356/237 |
| 5,000,569 | 3/1991 | Nylund | 356/237 |
| 5,060,290 | 10/1991 | Kelly et al. | 382/110 |
| 5,105,735 | 4/1992 | Gonzalvo | 99/590 |
| 5,170,698 | 12/1992 | Kirk | 99/472 |
| 5,335,791 | 8/1994 | Eason | 209/939 |
| 5,462,176 | 10/1995 | Hereford et al. | 209/577 |

OTHER PUBLICATIONS

Delta Computer Systems Inc., 11719 NE 95th Street, Vancouver, Washington, 98682-2444, CS2 Color Scanner. 12 pp. (no date).

Odenberg Peeling Systems and Methodology. (no date) (no place).

*Primary Examiner*—Leo Boudreau
*Assistant Examiner*—Bijan Tadayon
*Attorney, Agent, or Firm*—Lathrop & Clark

[57] ABSTRACT

At least a representative fraction of the peeled vegetables which have passed through a steam peeler, and abrasive peeler, or both, is presented to a video camera for inspection. The camera output is analyzed by a computer controller to determine the amount of peel remaining on the vegetable and displayed in a visual format to the operator. The controller provides information to the operator on peel fraction remaining so that the operator may manually adjust speed of brush rotation and auger speed or other parameters of the peeling apparatus, or automatically adjusts these parameters to maintain level of peel with varying vegetable attributes. More representative peel fraction data is obtained by analyzing only the central half of the vegetable image captured by the vision system.

14 Claims, 3 Drawing Sheets

VEGETABLE PEEL FRACTION INSPECTION APPARATUS

FIELD OF THE INVENTION

This invention relates to vegetable peeling apparatus in general, and to apparatus and methods for determining the amount of peel remaining on vegetables in particular.

BACKGROUND OF THE INVENTION

Vegetables which require peeling for end use, such as potatoes, are typically peeled in rotating drum peelers in a production line. These machines utilize an inclined drum with a fixed auger mounted to its interior which is rotated to advance potatoes at a constant rate. A series of brushes is mounted axially within the drum which rotate at a speed much greater than the drum speed. The brushes have thousands of stiff bristles which engage each potato against the drum wall and scrape a tiny portion of potato skin off with each contact with an advancing potato. Potatoes have a surface geometry which is highly irregular varying significantly from potato to potato. However, thousands of strokes by individual bristles can achieve the goal of a desired level of peel removal.

Not only do potatoes vary in size, they vary in skin adhesion, toughness, moisture content, and in other attributes which affect the ease or difficulty in removing peel. Furthermore, although these attributes vary from potato to potato, the change is more pronounced between potatoes from different producers, different harvest dates, or even loads from different fields or portions of fields. Potato product producers have strict needs for levels of peel removal in their finished product. The amount of peel on a processed potato may affect taste, cooking properties and appearance; hence, a potato peeler must remove peel at the desired level or the output will be unacceptable.

The amount of peel removed by a rotating drum peeler is a function of the number of bristle engagements with a particular potato. The number of engagements may be increased by rotating the brushes more rapidly, or by reducing the auger speed to increase the time a potato resides within the apparatus. Increased peel removal is not, however, achieved without some cost. After the first bristle has removed portions of potato peel, subsequent bristle engagements at the same location will remove not peel but usable flesh portions of the potato. Hence, excessive bristle engagements will unnecessarily reduce the amount of final processed potatoes produced, resulting in thousands of pounds of lost potatoes in a year, with a commensurate loss in revenues.

To avoid excessive peel, the brush rate should be adjusted frequently by the peeler operator. However, this adjustment requires careful attention by the machine operator, as well as a keen eye for determining levels of peel which may only vary by 2 to 12 percent.

What is needed is a vegetable peeler with an operator aid which will display peel fraction in a standardized format to the operator to allow vegetables to be peeled to a desired level and which will be self-adjusting under operator supervision to accommodate variations in input vegetable attributes.

SUMMARY OF THE INVENTION

The vegetable peel fraction inspection apparatus of this invention inspects at least a representative fraction of the vegetables which have been treated in a peeling apparatus. The peelers may be a rotating drum abrasive peeler, a steam peeler or a combination of both. A camera is positioned to detect at least a fraction of the vegetables output from the peeler. The camera output is analyzed by a computer controller to determine the amount of peel remaining on the vegetable and displayed in a visual format to the operator. The controller provides information to the operator on peel remaining to aid the operator in adjusting peeler speed of brush rotation and auger speed, or automatically adjusts these variables to maintain level of peel with varying vegetable attributes. More representative peel fraction data is obtained by analyzing only the central haft of the vegetable image captured by the vision system.

It is an object of the present invention to provide a peel detector which displays visual representations of peel fraction of sampled vegetables to allow peeling apparatus parameters to be adjusted with operator oversight.

It is another object of the present invention to provide a vegetable peeling system which reduces the amount of vegetable wasted during processing.

It is also an object of the present invention to provide a vegetable peeling vision system which accurately gauges the amount of peel removed from a representative vegetable sample.

Further objects, features, and advantages of the invention will be apparent from the following detailed description when taken in conjunction with the accompanying drawings.

DESCRIPTION OF THE PREFERRED EMBODIMENTS

Figure 1:
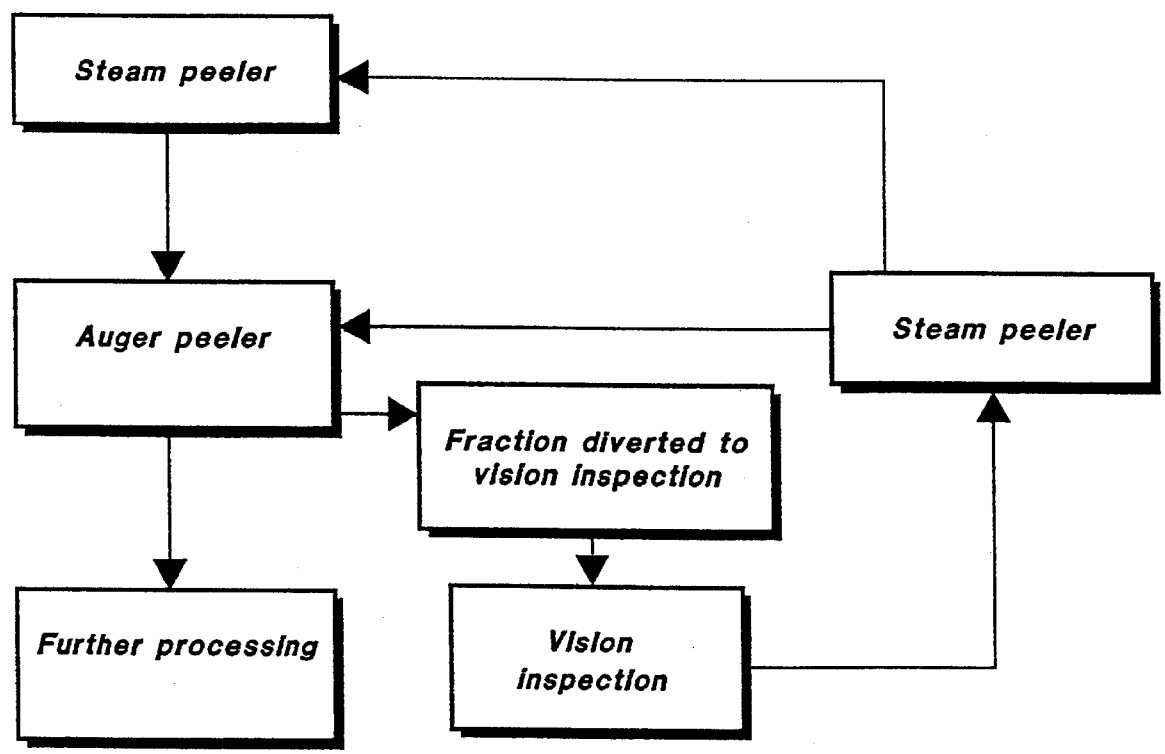
FIG. 1 is a flow chart illustrating the progress of vegetables through the peeling system of this invention.
Figure 2:
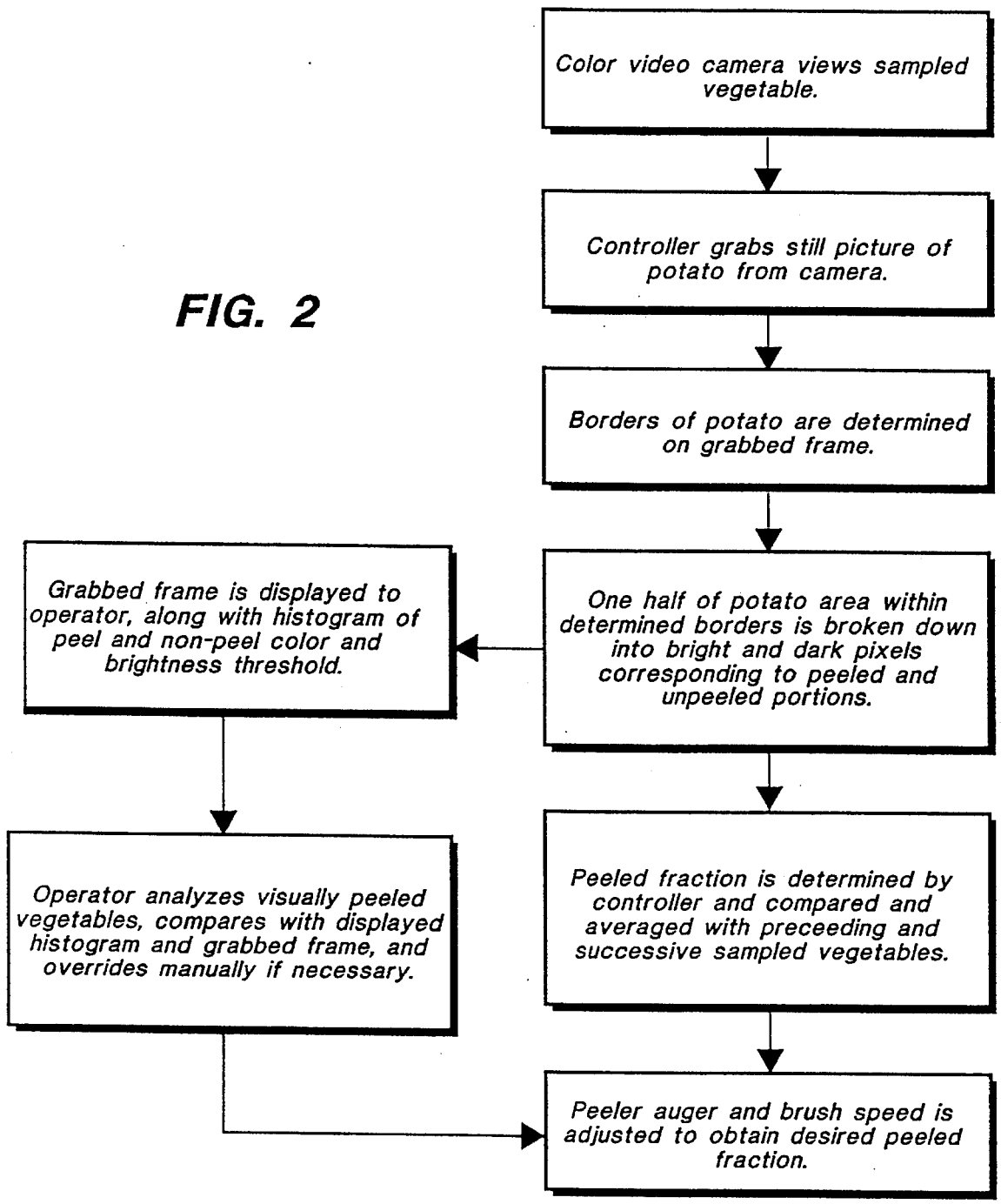
FIG. 2 is a flow chart illustrating the operation of the vision feedback apparatus of the system of FIG. 1.

Referring more particularly to FIGS. 1–5, wherein like numbers refer to similar parts, the component parts of a vegetable peeling system 20 are shown functionally in FIG. 1. Although the following discussion will be directed to peeling of potatoes, the apparatus may also be employed for peeling of other vegetables.

In a typical peeling application, peel is removed from a potato in a two step process. First the raw potatoes are batch loaded in a steam peeler drum, as indicated in the flow chart of FIG. 1. The steam peeler has a pressure vessel which is top loaded with potatoes and then sealed. The pressure vessel is rotated and steam at 200–300 psi is injected. When the high pressure steam contacts a potato, it immediately condenses, transferring the steam temperature instantaneously to the outer skin of the potato. Then, the pressure vessel is opened to relieve the pressure, which causes the high temperature moisture in the outer layer of the potato to vaporize and separate the skin from the potato flesh. The effectiveness of the peel separation from the flesh will depend on a number of parameters of the steam peeler: the residence time of the steam within the pressure vessel, and the temperature and pressure of the steam.

The potatoes which have been discharged from the steam peeler next flow to an abrasive peeler. The abrasive peeler has a frame to which are mounted a plurality of abrasive rollers or brushes. The rollers or brushes are mounted axially and engage with the potatoes to remove the potato skin from the potato. The rate of potato progress through the abrasive peeler may be controlled in a variety of ways. In one type of peeler a half-moon shaped gate is located at the outlet of the peeler, and the gate is rotated to obstruct or permit the flow of potatoes. A preferred means of controlling residence time within the abrasive peeler is a full length helical auger which extends axially within a U-shaped trough defined by the brushes and rollers.

In certain applications, for example in peeling potatoes for the potato chip industry, the potatoes are not passed through a steam peeler, but only through the abrasive peeler. The abrasive peeler for such an application would utilize only abrasive rollers, and no brushes.

When the potatoes are discharged from the abrasive peeler a fraction of peel will remain attached to the potato flesh. Although 100 percent peel removal may be obtained by over-peeling the potato, this certainty of peel removal comes only at the expense of removal of excessive amounts of usable potato flesh. What is desired is removal of peel up to the level required by the customer, but no more.

Figure 3:
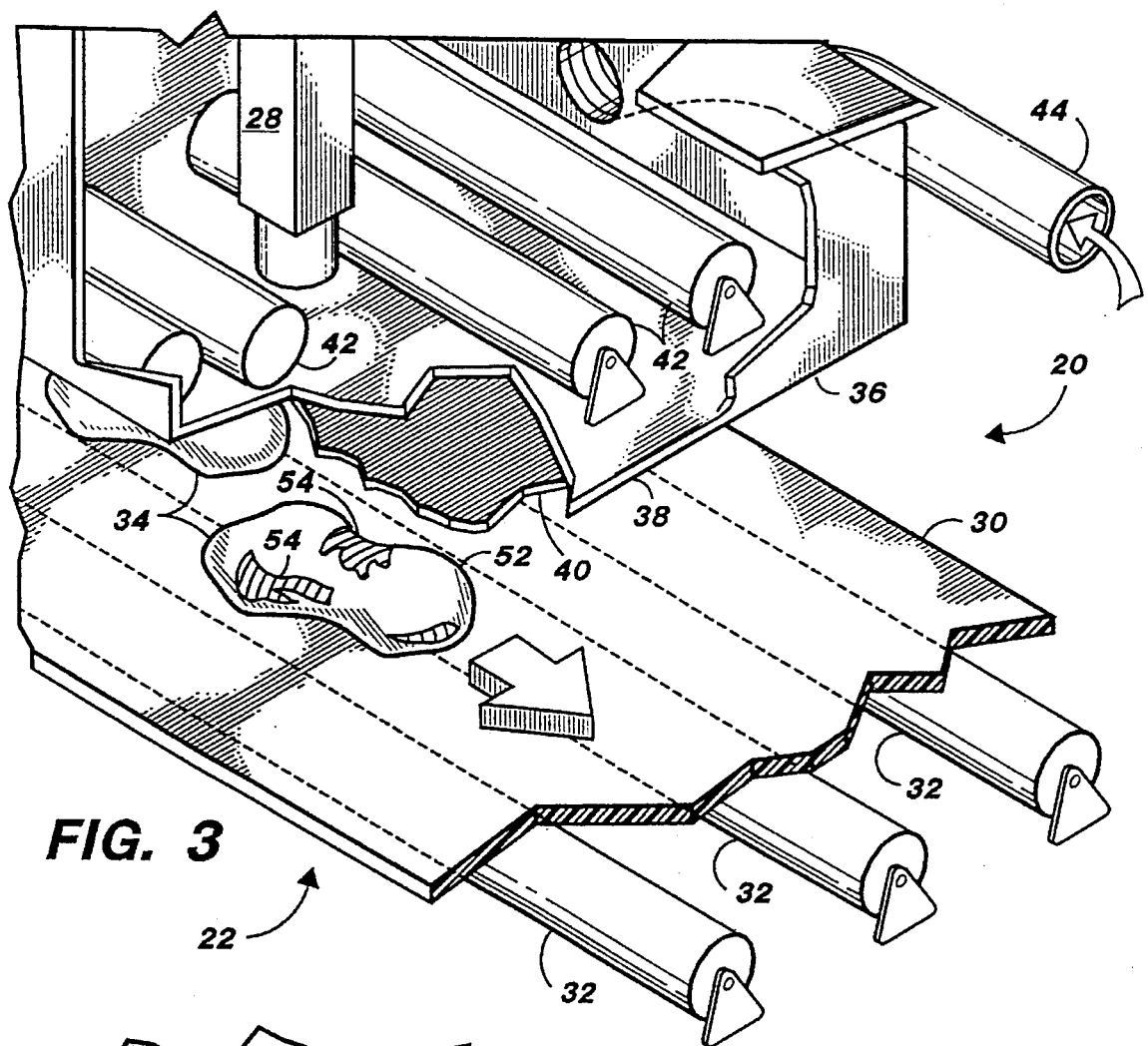
FIG. 3 is an isometric view, partially broken away, of the vision inspection station of the apparatus of FIG. 1.
Figure 4:
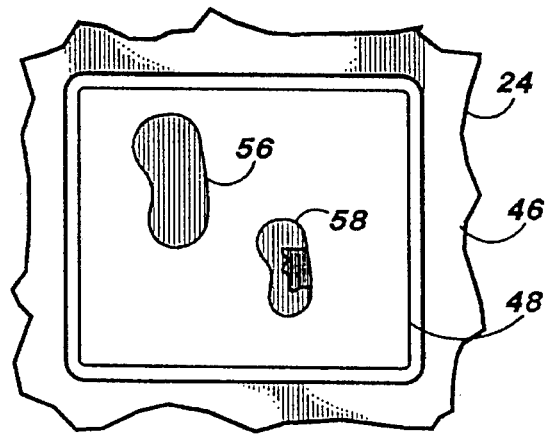
FIG. 4 is a representation of a visual screen display of the vision system of FIG. 1 presented for operator oversight.

The vision inspection station 22, shown in FIG. 3, inspects a representative fraction of the potatoes processed in the peeling system, and displays the peel fraction and an image of the peel remaining to an operator on a video monitor 24, shown in FIG. 3. In a preferred embodiment the inspection station 22 is free standing and independent of the model or type of peeling apparatus used. The inspection station 22 has a trough 26 through which a fraction of the processed potatoes are diverted to pass beneath a video camera 28. The trough 26 is formed with a floor 30 formed of a translucent light blue food grade plastic, preferably UHMW plastic. A bank of fluorescent lights 32 is mounted beneath the floor and directs light upwardly through the translucent plastic to provide a uniform bright blue background to the potatoes that pass over the floor. In a preferred embodiment the trough 26 is inclined downwardly and the potatoes are advanced by gravity. A bright blue background for the potatoes 34 is desireable to provide distinct color contrast to the colors of a potato. Potato flesh is white, potato peel is brown, and a partially peeled portion of potato is green.

An exemplary video camera 28 has a focal length of 16 mm and a maximum aperture of F 1.4. The camera 28 is fixed within a protective box 36 which is mounted above the trough floor 30. The box 36 is preferably formed of aluminum or stainless steel and has a transparent shield 38 which passes in front of the camera 28 and protects it from moisture, peel, and debris, while allowing a clear view of the potatoes on the trough floor 30. A polarizing filter 40 is affixed to the shield 38 to reduce glare to the camera. A plurality of fluorescent light tubes 42 are mounted within the box 36 on either side of the camera 28 and are positioned to bathe the potatoes on the trough floor 30 in an even light of consistent intensity. This lighting ensures a distinct contrast between the potato 34 and the floor 30.

Air ducts 44 extend into the box 36 to discharge ambient temperature air onto the fluorescent tubes 42 to prevent overheating. It should be noted that fluorescent lights will typically degrade in intensity and color over their approximately 8,000 hour life. This degradation will require recalibration of the vision system from time to time.

As potatoes pass under the camera 28 the signal from the camera is fed to an electronic controller 46. The controller 46 includes a digital computer having a frame grabber which holds a single frame 48 comprised of an array of picture elements or pixels 50.

As shown in FIG. 3, a sampled potato 34 will have exposed flesh regions 52 and retained peel regions 54. As shown in the flow chart of FIG. 2, once the controller 46 has grabbed a still frame of a potato from the camera, the borders of the viewed potato within the grabbed frame 48 are defined by detecting the change in color from the blue background. The silhouette 56 of the viewed potato is displayed on the monitor 24. Because a potato is a three dimensional object which has a curved surface, a flat picture such as the grabbed frame 48 will not proportionately translate viewed peel regions 54 into a fraction of peel. If a region of retained peel is on a surface of the potato which has a significant vertical component, the region will be foreshortened and hence will appear on the flat image as smaller in area than a region of like size that is located on a surface with a significant horizontal component. If all regions of peel are treated equally in calculating peel fraction there is the possibility that peel will be dramatically under-detected. To substantially eliminate these foreshortened regions, the controller 46 calculates one half of the potato area within the silhouette 56.

The computer algorithm is basically bit-mapped. The edges are traced with a standard tracing algorithm, and then the computer backs off a given amount from the edge depending on the particular shape of the potato and does not select a specific region, but just a region that is more representative of an actual peel of the potato that has less foreshortened regions.

Figure 5:
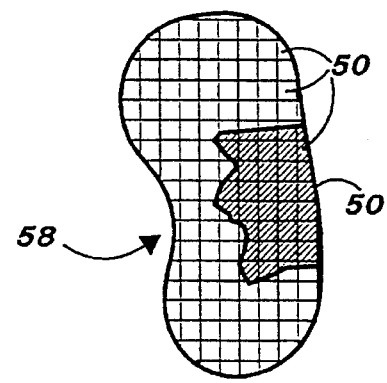
FIG. 5 is a schematic view illustrating a vegetable being broken up into picture elements for further analysis.

This one half area is the analysis region 58, in which the peeled fraction is determined by examining each pixel 50 within the region 58 for its color. As shown in FIG. 5, a dark pixel corresponds to peel, and a light pixel corresponds to potato flesh. The analysis region 58 is displayed on the monitor 24 alongside the silhouette 56 for operator observation. The determined peel fraction is also displayed on the monitor, along with statistics showing the cumulative average of peel fraction remaining. As a further aid to the operator, a histogram of peel and non-peel color and brightness threshold is displayed.

With respect to percent peel remaining, the number refers to the most recent potato analyzed and the running average of all the potatoes it has seen since it has been reset.

The controller 46 has user accessible functions which provide additional features. A statistic reset function allows the operator to reset the cumulative averages displayed. This function would be employed when beginning operation on a new batch or variety of potatoes.

A calibrate function allows the operator to calibrate the inspection station 22 for ambient light and other variable conditions. The "Calibrate" function causes the computer to analyze the field of view when there are no potatoes so it is just looking at the blue screen. "Train on" and "train off" functions allow the apparatus to run with completely peeled potatoes to allow the computer to analyze what a completely peeled potato looks like. A "reset train" button starts the training process over again. Operator control buttons labelled "more peel" and "less peel", allow control over the decision the computer makes on whether or not a portion of the potato it is viewing is peeled or not and it increases or lowers the level of darkness which the computer considers peeled or doesn't considered peeled.

The vision system operates in normal mode where it is grabbing 30 frames a second and does some brief calculations to determine whether the potato is reasonably centered and then stops grabbing them and spends approximately another 2/30 of a second performing the whole analysis on the potato to develop the peeled percent statistics. A "long freeze" function is employed which holds a particular image for an extended period and assists in debugging and checking what the computer is doing.

Typically the operator will select a "No freeze" mode, which is the normal display mode in which the apparatus is just taking the pictures when it gets one in the right area. It stops for a brief period while it analyzes it and then goes on. With a Pentium-equipped computer it would be possible to analyze every single frame. However, in practice it is only necessary to analyze a random sample of the potatoes that are coming through. After approximately 200 potatoes, the statistics are rather good. The invention uses a convention basic-pc based microprocessor with an added board to translate the output of the computer back into standard video format so that the monitor can be switched between the video camera, which is watching the potatoes go under it, and the computer output. The computer, in doing the frame grab, normally uses the RGB standard, but could use the HSI standard to analyzing the potatoes. Color could be used to determine whether an unpeeled area is bruised or green.

The vision system is a typical video camera type ccd array. It takes color pictures and grabs a frame every 1/30 of a second. The computer analyzes that to see whether it is a good frame with a potato centered and then performs the full analysis when it has a good representative frame. With a more powerful computer, with greater processing capabilities, every frame can be analyzed.

The operator may also adjust the controller to display a single grabbed frame for a short duration or a long duration. A short duration frozen frame will continually flash the silhouette and analysis region of the potatoes passing under the camera in real time. A long duration frozen frame gives the operator an opportunity to carefully study the peel remaining, and to make a judgment about the accuracy of the controller's determination of peel fraction remaining.

The inspection station 22, when used as an independent station, will allow the operator to observe the peel fraction statistics and manually adjust the controls of the abrasive peeler or the steam peeler or both to alter the peel fraction. Alternatively, the controller may be wired directly to the peelers as shown in FIG. 1 to bring about an automatic adjustment in peel fraction until a desired level of peel remaining is obtained.

It is understood that the invention is not confined to the particular construction and arrangement of parts herein illustrated and described, but embraces all such modified forms thereof as come within the scope of the following claims.

We claim:

1. An apparatus for measuring the amount of peel removal from a potato comprising:

a) a stand through which potatoes having surfaces which have been peeled are moved;

b) a camera mounted to the stand for imaging potatoes passing through the stand, wherein the camera is directed to view the potatoes against a surrounding background, and wherein the camera forms an image corresponding to the viewed potatoes and produces an electrical signal corresponding to the image;

c) a first means for projecting light in the direction viewed by the camera;

d) a second means for projecting a second light, the second means including a translucent floor through which the second light projects, the second means positioned so the potatoes are moved between the second means and the camera;

e) an electric controller which receives the camera signal and which processes the signal to produce an image of the potato, said image highlighting the peel condition of the surface of the potato, and wherein the controller calculates the fraction of peel which remains on the peeled potato; and f) a display for allowing an operator to view the controller processed image of the viewed potatoes and displaying information relating to the completeness of peel removal.

2. The apparatus of claim 1 wherein a filter, in front of the second light passes blue light so as to form a blue screen.

3. The apparatus of claim 1 further comprising a conveyor on which the potatoes are placed and which moves the potatoes through the stand so that a stream of potatoes may be inspected for completeness of peel removal.

4. An apparatus for measuring the amount of peel removal from a vegetable comprising:

a) a stand through which vegetables having surfaces which have been peeled are moved;

b) a camera mounted to the stand for imaging vegetables passing through the stand, wherein the camera is directed to view the vegetables against a surrounding background, and wherein the camera forms an image corresponding to the viewed vegetables and produces an electrical signal corresponding to the image;

c) a first light for projecting light in the direction viewed by the camera;

d) a second light positioned so the vegetables are moved between the second light and the camera;

e) an electric controller which receives the camera signal and which processes the signal to produce an image of the vegetable, said image highlighting the peel condition of the surface of the vegetable, and wherein the controller calculates the fraction of peel which remains on the peeled vegetable, and wherein the controller maps the image of the vegetable into a memory and employs an algorithm to find the borders of the imaged vegetable, so defining a first area corresponding to the projected cross section of the vegetable, followed by an algorithm that defines a second area of the stored image amounting to about 50 percent of the imaged area wherein the second area is chosen so as to correspond to that portion of the vegetable surface which has minimal foreshortening in the image of the vegetable; and f) a display for allowing an operator to view the controller processed image of the viewed vegetables and displaying information relating to the completeness of peel removal.

5. The apparatus of claim 1 wherein the camera is of the video imaging type.

6. The apparatus of claim 1 wherein the first means for projecting light are of the florescent type and are mounted to the stand on either side of the camera.

7. The apparatus of claim 1 further comprising: a storage memory for reserving the percent of peel on a given potato.

8. The apparatus of claim 7 further comprising: a second storage memory containing a running average of the values stored in the first memory.

9. The apparatus of claim 8 wherein the information displayed on the display relating to completeness of peel removal is the value stored in the first and second memories.

10. The apparatus of claim 1 wherein the controller has a calibration mode which may be used to calibrate a peel detecting algorithm.

11. The apparatus of claim 1 wherein the display is a color video monitor.

12. An apparatus for measuring the amount of peel removal from a potato comprising:

a) a trough through which potatoes having surfaces which have been peeled are moved;

b) a camera mounted above the trough for imaging potatoes passing through the trough, wherein the trough has a floor over which the potatoes pass which is selected of a color which provides contrast to the potatoes, and wherein the camera produces an electrical signal corresponding to the image;

c) a first light which illuminates the potatoes for viewing by the camera; and d) an electric controller which receives the camera signal and which processes the signal to produce an image of the potato and which calculates the fraction of peel which remains on the peeled potato, and wherein the trough floor is translucent and a second light is positioned beneath the floor to provide a luminous background to the potatoes.

13. The apparatus of claim 12 further comprising a polarized filter positioned between the camera and the potatoes for improving the contrast between the potatoes and the background.

14. An apparatus for measuring the amount of peel removal from a vegetable comprising:

a) a trough through which vegetables having surfaces which have been peeled are moved;

b) a camera mounted above the trough for imaging vegetables passing through the trough, wherein the trough has a floor over which the vegetables pass which is selected of a color which provides contrast to the vegetables, and wherein the camera produces an electrical signal corresponding to the image; and c) a computer which analyzes the electrical signal corresponding to the image by first subtracting from the image a portion adjacent to an exterior edge which corresponds to a portion of the vegetable image which is foreshortened, so forming a remainder image, wherein the computer calculates the fraction of peel which remains on the peeled vegetable by analyzing the electrical signal corresponding to the remainder image.

* * * * *